(12) United States Patent
Baumann et al.

(10) Patent No.: US 8,296,927 B2
(45) Date of Patent: Oct. 30, 2012

(54) ASSEMBLY METHOD FOR LIQUID COOLED PERMANENT MAGNET ROTOR

(75) Inventors: Jonathan M. Baumann, Peoria, IL (US); Matthew W. Dames, Brimfield, IL (US); Perry G. Cruce, Marquette Heights, IL (US); David M. Fee, Groveland, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/223,695

(22) Filed: Sep. 1, 2011

(65) Prior Publication Data

US 2011/0308071 A1 Dec. 22, 2011

Related U.S. Application Data

(62) Division of application No. 12/317,812, filed on Dec. 30, 2008, now Pat. No. 8,022,582.

(51) Int. Cl.
*H02K 15/12* (2006.01)
(52) U.S. Cl. .......................................... 29/596; 29/598
(58) Field of Classification Search ............ 29/596–598; 310/156.56, 54, 58, 64
See application file for complete search history.

(56) References Cited

U.S. PATENT DOCUMENTS

| | | | |
|---|---|---|---|
| 2,618,756 A | 11/1952 | Fechheimer | |
| 2,894,155 A | 7/1959 | Labastie | |
| 2,974,240 A | 3/1961 | Arutunoff | |
| 3,240,967 A | 3/1966 | Krastchew | |
| 3,260,872 A | 7/1966 | Potter | |
| 3,582,977 A | 6/1971 | Smith | |
| 3,629,628 A | 12/1971 | Rank et al. | |
| 3,729,641 A | 4/1973 | Sato et al. | |
| 3,800,174 A | 3/1974 | Butterfield et al. | |
| 3,805,547 A | 4/1974 | Eber | |
| 4,496,293 A | 1/1985 | Nakamura et al. | |

(Continued)

OTHER PUBLICATIONS

Shibuya Hisao et al.; English Abstract of JP200108413, published Jan. 12, 2001; 1 page.

(Continued)

*Primary Examiner* — Minh Trinh
(74) *Attorney, Agent, or Firm* — Liell & McNeil

(57) ABSTRACT

A permanent magnet rotor for an electrical generator includes a rotor shaft and a rotor core mounted coaxially upon the rotor shaft. The rotor core defines a plurality of longitudinal core passages which include a segment of a rotor cooling circuit, and further includes a permanent magnet outer core component mounted on an inner core component and including a plurality of permanent magnets. A cooling liquid containment mechanism for the permanent magnet rotor includes a first liquid containment cover coupled to the inner core component and a second liquid containment cover coupled to the inner core component. The liquid containment covers are configured to contain cooling liquid passed from an inlet segment of the rotor cooling circuit defined by the rotor shaft into the plurality of longitudinal core passages, and thenceforth into an outlet segment of the rotor cooling circuit also defined by the rotor shaft. The liquid containment covers are mounted on the inner core component at locations radially inward of a cylindrical outer surface thereof.

7 Claims, 2 Drawing Sheets

U.S. PATENT DOCUMENTS

| | | | |
|---|---|---|---|
| 4,647,805 A | 3/1987 | Flygare et al. | |
| 4,692,644 A | 9/1987 | Lenz et al. | |
| 4,987,674 A * | 1/1991 | Denk | 29/596 |
| 5,189,325 A | 2/1993 | Jarczynski | |
| 5,319,272 A | 6/1994 | Raad | |
| 5,365,133 A | 11/1994 | Raad | |
| 5,394,043 A | 2/1995 | Hsia | |
| 5,682,074 A | 10/1997 | Di Pietro et al. | |
| 6,657,333 B2 | 12/2003 | Shoykhet et al. | |
| 6,661,133 B2 | 12/2003 | Liebermann | |
| 6,727,609 B2 | 4/2004 | Johnsen | |
| 6,734,585 B2 | 5/2004 | Tornquist et al. | |
| 8,022,582 B2 * | 9/2011 | Dames et al. | 310/54 |
| 2003/0030333 A1 | 2/2003 | Johnsen | |
| 2003/0075996 A1 * | 4/2003 | Yoshida et al. | 310/58 |
| 2005/0174008 A1 | 8/2005 | Tsai | |
| 2006/0082228 A1 | 4/2006 | Urbahn et al. | |
| 2007/0120427 A1 | 5/2007 | Lund et al. | |
| 2008/0024020 A1 | 1/2008 | Lund et al. | |
| 2011/0308071 A1 * | 12/2011 | Baumann et al. | 29/598 |

OTHER PUBLICATIONS

Uesugi Masakazu et al.; English Abstract of JP2001218425, published Aug. 10, 2001; 1 page.

Emiru Debitsuto Jiyaakuzuinsuk; English Abstract of JP4229049, published Aug. 18, 1992; 1 page.

Kawabata Kazuaki et al.; English Abstract of JP8065960, published Mar. 8, 1996; 1page.

Winfried Felder et al.; English abstract of EP0921623, published Jun. 9, 1999; 1 page.

Nicolai Tarasinski et al.; English Abstract of WO2005099070, published Oct. 20, 2005; 1page.

Hara Takeshi et al.; English Abstract EP1049234, published Nov. 2, 2000; 1 page.

Michael John Werson; English Abstract GB2401487, published Nov. 10, 2004; 1 page.

Robert Bosch, GmbH; Gebrauchsmuster Rollennummer G89147561; published prior to May 23, 1991; 26 pp.; Germany.

* cited by examiner

US 8,296,927 B2

ASSEMBLY METHOD FOR LIQUID COOLED PERMANENT MAGNET ROTOR

RELATION TO OTHER PATENT APPLICATIONS

This Application is a divisional of U.S. patent application Ser. No. 12/317,812, filed Dec. 30, 2008, and now U.S. Pat. No. 8,022,582 B2.

TECHNICAL FIELD

The present disclosure relates generally to electrical generator components, and relates more particularly to containing a cooling liquid passed through a permanent magnet rotor via liquid containment covers mounted on axial rotor core ends.

BACKGROUND

A great many different types of electrical generators are known and used in different applications. In general, generators include a rotating mechanism known as a rotor which includes permanent magnets or induction coils and is typically positioned internally of a stationary mechanism known as a stator. Rotation of the rotor, often by an external means such as an internal combustion engine, induces electrical current in the stator, which can be used to perform work. Operation of electrical generators tends to produce heat which must typically be dissipated in some manner to avoid overheating the system. One common strategy for cooling electrical generators, and in particular for cooling electrical generator rotors, is to pass air through the generator to dissipate heat. Passive heat dissipation strategies are also known. In some instances, however, conventional cooling techniques are not sufficient or impractical and another strategy such as spraying a liquid like oil or engine coolant onto parts of the generator is used. Oil spray techniques and the like have their own set of drawbacks. In the case of permanent magnet generators, debris carried via the cooling fluid may magnetically adhere to the rotor, eventually affecting its operation.

In addition to effectively cooling generator components, another challenge relates to properly balancing a rotor. Many machine components, and in particular cast machine components of the type commonly used in permanent magnet stators, tend to have inherent variability in the location of the center of mass of a component. In other words, many stators formed of cast material will tend to have a certain degree of deviation in a location of the center of mass from a theoretical geometric center of the component. If the deviation in center of mass issues are not addressed, operation of the generator may be negatively affected. In particular, unbalanced rotors can result in vibrations within the system and premature wear of components such as bearings. Suppliers of rotors have traditionally mounted balancing mass on the rotor core itself. This is commonly achieved by machining bores in the rotor core, then threading mass mounting bolts or the like into the machined bores. Mass can then be selectively mounted on or retained by the bolts to compensate for asymmetry in the mass distribution of the rotor core.

An induction generator having a balancing mechanism and liquid cooling is known from U.S. Pat. No. 6,734,585 B1 to Tornquist et al. The disclosure of Tornquist et al is directed to rotor end caps for a high speed generator. The end caps include a manifold for circulating fluid through the rotor. Induction coils mounted in wedges are retained during operation via the end caps, which also assist via their manifolds in circulating cooling fluid through the wedges. Mass for balancing is inserted into the end caps. While the design of Tornquist et al. may be effective in its intended high speed environment, it is less well suited to generators of certain other designs, and may be prohibitively complex and costly for lower speed environments.

SUMMARY

In one aspect, a permanent magnet rotor for an electrical generator includes a rotor shaft defining a longitudinal shaft axis, a first longitudinal shaft passage which includes an inlet segment of a rotor cooling circuit and a second longitudinal shaft passage which includes an outlet segment of the rotor cooling circuit. The permanent magnet rotor further includes a rotor core having an inner core component coaxial with the rotor shaft and defining a plurality of longitudinal core passages which include a third segment of the rotor cooling circuit. The rotor core further includes a first axial inner core end, a second axial inner core end, a cylindrical outer surface and a permanent magnet outer core component having a plurality of permanent magnets mounted circumferentially about the cylindrical outer surface. A cooling liquid containment mechanism is further provided and configured to contain a cooling liquid passed through the rotor cooling circuit. The cooling liquid containment mechanism includes a first liquid containment cover sealingly coupled to the inner core component at a first mounting location on the first axial inner core end, and a second liquid containment cover sealingly coupled to the inner core component at a second mounting location on the second axial inner core end. Each of the first mounting location and the second mounting location are radially inward of the cylindrical outer surface of the inner core component.

In another aspect, a method of operating an electrical generator rotor having a rotor shaft with a longitudinal axis and a permanent magnet rotor core mounted to rotate within a stator and being positioned coaxially on the rotor shaft includes inducing a temperature increase in a plurality of permanent magnets of an outer core component of the permanent magnet rotor core at least in part by rotating the permanent magnet rotor core within the stator. The method further includes dissipating heat from the permanent magnet rotor core at least in part by passing a cooling liquid between a shaft passage extending longitudinally in the rotor core and a plurality of core cooling passages extending longitudinally in an inner core component of the permanent magnet rotor core. The method still further includes containing the cooling liquid via a first liquid containment cover sealingly coupled to a first axial inner core end of the inner core component and a second liquid containment cover sealingly coupled to a second axial inner core end of the inner core component.

In still another aspect, a method of assembling a permanent magnet rotor for an electrical generator includes mounting an inner core component having a plurality of longitudinally extending core passages coaxially on a rotor shaft defining a first longitudinally extending shaft passage and a second longitudinally extending shaft passage. The method further includes positioning a permanent magnet outer core component circumferentially about the inner core component. The method still further includes fluidly connecting a first rotor cooling circuit segment which includes the first longitudinally extending shaft passage with a second rotor cooling circuit segment which includes the plurality of longitudinally extending core passages via sealingly coupling a first liquid containment cover to a first axial end of the inner core component at a first mounting location which is radially inward of a cylindrical outer surface of the inner core component. The method still further includes fluidly connecting the second rotor cooling circuit segment with a third rotor cooling circuit segment which includes the second longitudinally extending shaft passage via sealingly coupling a second liquid containment cover to a second axial end of the inner core component at a second mounting location which is radially inward of the cylindrical outer surface of the inner core component.

In still another aspect, a permanent magnet rotor for an electrical generator includes a rotor shaft defining a longitudinal shaft axis, a first longitudinal shaft passage and a second longitudinal shaft passage. The permanent magnet rotor further includes a permanent magnet rotor core mounted coaxially on the rotor shaft and defining a plurality of longitudinal core passages. A rotor cooling circuit is provided having a first segment which includes the first longitudinal shaft passage, a second segment which includes the plurality of longitudinal core passages and a third segment which includes the second longitudinal shaft passage. The permanent magnet rotor further includes a first liquid containment cover sealingly coupled to the permanent magnet rotor core and including an axially outward side and an axially inward side, the axially inward side including a first profiled wetted surface of the rotor cooling circuit which is configured to deflect a cooling liquid passing out of the first segment into the second segment of the rotor cooling circuit. The permanent magnet rotor still further includes a second liquid containment cover sealingly coupled to the permanent magnet rotor core and also including an axially outward side and an axially inward side, the axially inward side of the second liquid containment cover including a second profiled wetted surface of the rotor cooling circuit which is configured to deflect cooling liquid passing out of the second segment into the third segment of the rotor cooling circuit.

DETAILED DESCRIPTION

Figure 1:
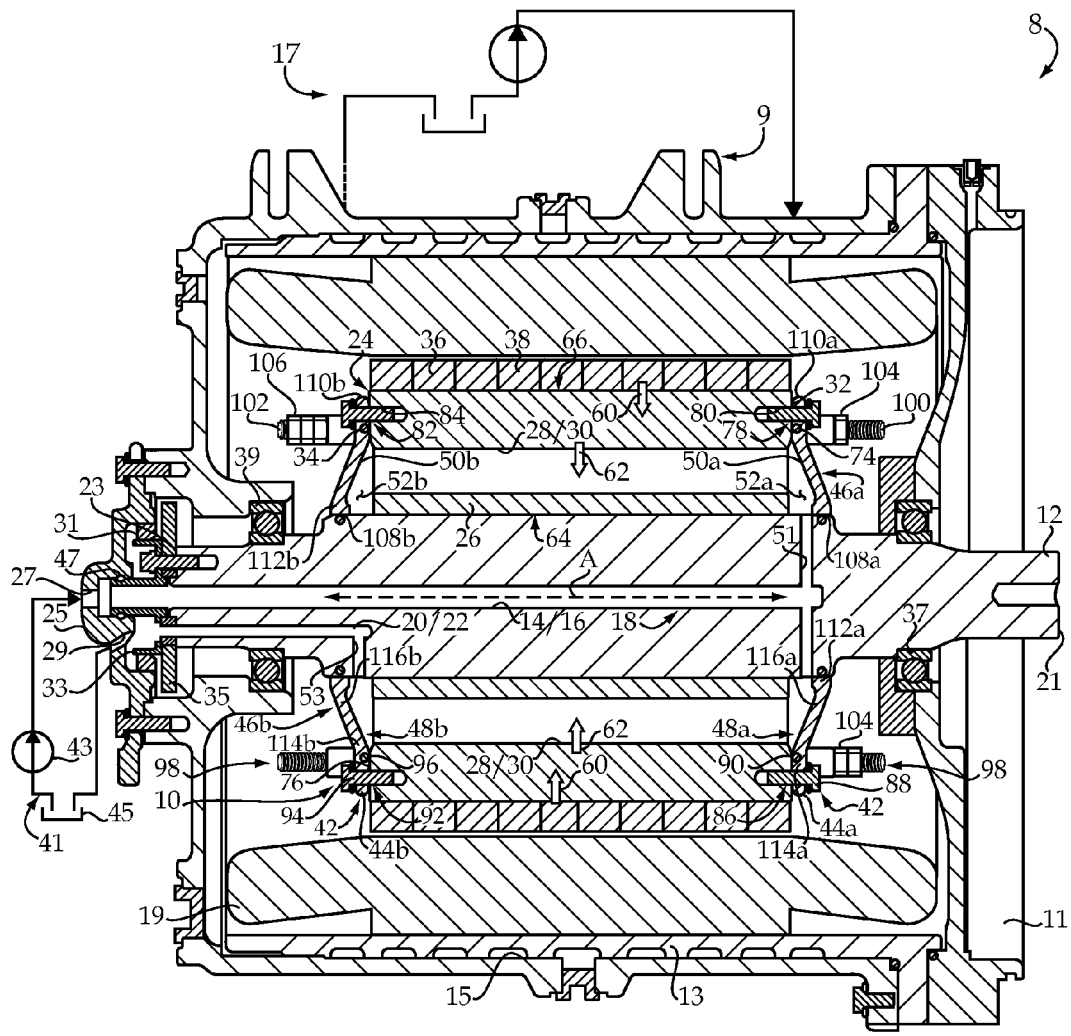
FIG. 1 is a partially sectioned side diagrammatic view of an electrical generator having a permanent magnet rotor, according to one embodiment.

Referring to FIG. 1, there is shown an electrical generator 8 having a permanent magnet rotor 10 located therein, according to one embodiment. Generator 8 may include a shell 9 coupled with an end bell 11, and a cooling jacket 13 positioned within shell 9. In one embodiment, cooling jacket 13 may together with shell 9 define one or more cooling fluid passages 15, which are adapted to transition a cooling fluid to dissipate heat generated during operation of generator 8. To this end, a first cooling system 17 may be provided which connects with passages 15 to transition a cooling fluid therethrough. Cooling system 17 may include a radiator (not shown). In other embodiments, a different housing structure or cooling strategy might be used without departing from the scope of the present disclosure. A stator 19 may be positioned within cooling jacket 13, such as by way of a press fit. Stator 19 may be configured to connect with an electrical system (not shown) having any of a variety of electrically powered devices or electrical power storage media. Rotor 10 may be positioned within and configured to rotate within stator 19 to induce electrical current therein, for supplying to an electrically powered device, for storage, etc. In one embodiment, generator 8 may be used in an electrical propulsion system of a machine such as a track-type tractor, loader, truck, backhoe, paver, grader or still another machine. Generator 8 might alternatively be used to supply power in a stationary industrial facility or the like.

Rotor 10 may include a rotor shaft 12 which defines a longitudinal shaft axis A, a first longitudinal shaft passage 14 and a second longitudinal shaft passage 20. First longitudinal shaft passage 14 may include an inlet segment 16 of a rotor cooling circuit 18 and extends longitudinally in rotor shaft 12. Second longitudinal shaft passage 20 may include an outlet segment 22 of rotor cooling circuit 18 and also extends longitudinally in rotor shaft 12. "Longitudinal" should be understood to mean generally aligned with, but not necessarily parallel, to axis A. In other embodiments, multiple passages might comprise inlet segment 16 and/or outlet segment 22. Passages 14 and 20 may be radially spaced from one another within rotor shaft 12. A second cooling system 41 may be provided, which connects with rotor cooling circuit 18 via an inlet 27, and also via an outlet 29. Inlet 27 and outlet 29 may be formed in an end cover 25 coupled with shell 9 in one embodiment. Cooling system 41 may include a sump 45 and a pump 43 in one embodiment. A radiator or other cooling mechanism (not shown) for cooling liquid such as oil, coolant, water, mixtures, etc. might also be provided and disposed between pump 43 and sump 45.

Rotor shaft 12 may include a first axial shaft end 21 and a second axial shaft end 23, and may have a permanent magnet rotor core 24 mounted circumferentially about rotor shaft 12 between first axial shaft end 21 and second axial shaft end 23. Rotor core 24 may include an inner core component 26 which is coaxial with rotor shaft 12 and defines a plurality of longitudinal core passages 28 which together include a third segment or core cooling segment 30 of rotor cooling circuit 18. As used herein, the terms "third segment" and "second segment" of rotor cooling circuit 18 are used for convenience and are not intended to imply any particular structural relationship. Thus, segment 30 might also be understood as a "second segment" of rotor cooling circuit 18 since it is encountered by cooling liquid which has passed out of inlet segment 16 but not yet reached outlet segment 22. Longitudinal core passages 28 may be disposed radially symmetrically about longitudinal shaft axis A.

Rotor core 24 may further include a first axial inner core end 32, a second axial inner core end 34 and a permanent magnet outer core component 36 having a plurality of permanent magnets 38. In one embodiment, magnets 38 may be arranged in a plurality of rows extending circumferentially about inner core component 26 and a plurality of columns extending parallel axis A. In one embodiment, magnets 38 may include rare earth magnets of a variety of different types. Magnets 38 might include neodymium magnets in one embodiment, however, the present disclosure is not thereby limited. Inner core component 26 may include a magnetically permeable material such as cast iron, and rotor core 24 may be magnetically saturated via a magnetic field produced by magnets 38. Inner core component 26 may have a cylindrical outer surface 66 whereupon magnets 38 are circumferentially mounted. Magnets 38 may be glued to cylindrical outer surface 66 or retained thereon in another suitable manner. A flexible tape such as a glass tape or the like may be wrapped about magnets 38 in one embodiment. As will be further apparent from the following description, a cooling liquid such as water, water glycol mixtures, etc., may be circulated through rotor cooling circuit 18 by supplying a cooling liquid to longitudinal shaft passage 14 via inlet 27, passing the cooling liquid through longitudinal core passages 28, and then passing the cooling liquid out of rotor 10 via second longitudinal shaft passage 20 and outlet 29. During operation, cooling liquid may be contained entirely within rotor 10 in cooperation with a cooling liquid containment mechanism 42, further described herein.

Rotor shaft 12 may be rotatably journaled in shell 9 by way of a first bearing 37 positioned adjacent first axial shaft end 21 and also by way of a second bearing 39 positioned adjacent second axial shaft end 23. As mentioned above, end cover 25 may define inlet 27 and also outlet 29. Several additional components may be positioned within or in the proximity of end cover 25 to assist in providing the desired fluid seals for circulating cooling fluid through rotor 10. In particular, a first seal 47 such as a Vespel® seal or other suitable sealing mechanism may be mounted on a seal carrier 33 positioned within end cover 25 and bolted to second axial shaft end 23. Seal carrier 33 thus rotates with rotor 10, at least partially inside end cover 25, and seal 47 fluidly seals between end cover 25 and seal carrier 33 at an axially outward location. A lip seal 31 or other suitable sealing mechanism may be positioned radially outward of seal carrier 33 and axially inward of seal 47 to form another fluid seal with end cover 25. Seal 47 may provide a liquid seal between inlet segment 16 and outlet segment 22. The pressure drop between inlet segment 16 and outlet segment 22 may be between about 10 PSI and about 30 PSI such that a Vespel® seal or other relatively higher pressure seal is desirable for use as the rotating seal 47 shown in FIG. 1. Lip seal 31 may be understood to fluidly seal between outlet segment 22 and an interior of generator 8, such as an interior space defined by cooling jacket 13. The pressure drop across lip seal 31 will tend to be relatively lower, possibly as low as 1 PSI, and thus a relatively lower pressure seal may provide a practical implementation strategy. A rotor speed timing mechanism 35 may be clamped between seal carrier 33 and second axial shaft end 23 in one embodiment to enable feedback and control mechanisms for generator 8. A variety of suitable rotor speed control/sensing mechanisms are known in the art and will not be described in detail herein.

As mentioned above, cooling liquid containment mechanism 42 may be used to contain cooling liquid passed through rotor cooling circuit 18. In one embodiment, cooling liquid containment mechanism 42 includes a first liquid containment cover 44a sealingly coupled to inner core component 26 at a first mounting location on first axial inner core end 32 which is radially inward of cylindrical outer surface 66. Cooling liquid containment mechanism 42 may further include a second liquid containment cover 44b sealingly coupled to inner core component 26 at a second mounting location on second axial inner core end 34 which is also radially inward of cylindrical outer surface 66. Each of the first mounting location and the second mounting location may be radially outward of longitudinal core passages 28. A first radial land area 74 may be located on first axial inner core end 32, and a second radial land area 76 may be located on second axial inner core end 34. A first mounting interface 78 may be provided which includes a first set of bolt holes 80 defined by inner core component 26 and extending in an axially inward direction from first radial land area 74. First set of bolt holes 80 may be adapted for boltingly mounting first liquid containment cover 44a. A second mounting interface 82 may also be provided which includes a second set of bolt holes 84 defined by inner core component 26 and extending axially inward from second radial land area 76. As used herein, "radial" refers to a direction substantially normal to axis A. Second set of bolt holes 84 may be adapted for boltingly mounting second liquid containment cover 44b. Bolt holes 80 and 84 may thus extend in opposed axially inward directions from radial land areas 74 and 76, respectively.

A first bolted joint 86 may connect first liquid containment cover 44a to first radial land area 74, and includes a first set of bolts 88 mated with first set of bolt holes 80 and a first O-ring seal 90 positioned between first radial land area 74 and first liquid containment cover 44a such that first liquid containment cover 44a is sealingly coupled to inner core component 26. A second bolted joint 92 may connect second liquid containment cover 44b to second radial land area 76 and includes a second set of bolts 94 mated with second set of bolt holes 84, and also a second O-ring seal 96 positioned between second radial land area 76 and second liquid containment cover 44b to enable sealingly coupling second liquid containment cover 44b to inner core component 26.

Rotor 10 may still further include a rotor balancing mechanism 98 for changing a location of a center of mass of rotor 10 to avoid problems such as excessive bearing wear, vibrations, etc. In one embodiment, rotor balancing mechanism 98 may include a first set of balancing mass mounts 100 positioned on first liquid containment cover 44a, and a second set of balancing mass mounts 102 positioned on second liquid containment cover 44b. The first and second sets of balancing mass mounts 100, 102 may be configured for mounting balancing mass thereon to change a mass distribution of permanent magnet rotor 10. In one further embodiment, each of first and second sets of balancing mass mounts 100, 102 may include a plurality of mass mounting studs 100, 102 extending in opposed first and second axially outward directions, respectively. Rotor 10 may also include a first set of mass elements 104 mounted on first set of balancing mass mounts 100 and a second set of mass elements 106 mounted on second set of balancing mass mounts 102. Each of first set of mass elements 104 and second set of mass elements 106 may be arranged radially asymmetrically about longitudinal shaft axis A.

Figure 2:
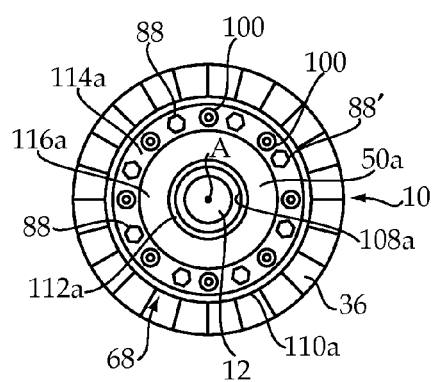
FIG. 2 is an end view of a permanent magnet rotor according to one embodiment.

Referring also to FIG. 2, there is shown an end view of rotor 10 illustrating certain of the components of rotor 10 already described herein, and also illustrating additional components to be described below. In the end view illustration of FIG. 2, it may be noted that mass mounts 100 are arranged on first liquid containment cover 44a about longitudinal shaft axis A and positioned more or less at a uniform radial distance from longitudinal shaft axis A. Mass mounts 100 may alternate with bolts 88 about longitudinal shaft axis A, and in the FIG. 2 illustration are shown without balancing mass mounted thereon for clarity. It may further be noted that mass mounts 100 are arranged substantially radially symmetrical about axis A, and also that bolts 88 are arranged substantially radially symmetrical about axis A. In one embodiment, first set of bolts 88 may further include at least one bolt 88' which is arranged radially asymmetrically about axis A with respect to the other bolts 88. It will be recalled that bolts 88 mate with first set of bolt holes 80. Accordingly, the arrangement of bolts 88, 88' shown in FIG. 2 is substantially identical to an arrangement of bolt holes 80 shown in cross section in FIG. 1. Thus, bolt holes 80 may include at least one bolt hole which is arranged radially asymmetrically about longitudinal axis A relative to the other bolt holes 80 of the corresponding set.

Arranging bolt holes 80, and also bolt holes 84, to include at least one asymmetric bolt hole allows the corresponding liquid containment cover 44a, 44b to key with inner core component 26 of rotor core 24 at a single radial orientation about longitudinal shaft axis A. In other words, there is only one relative radial orientation of each liquid containment cover 44a and 44b with respect to inner core component 26 at which liquid containment covers 44a and 44b may be coupled therewith. When rotor 10 is prepared for service, balancing may take place by mounting balancing mass 104 and 106 on balancing mass mounts 100 and 102, respectively, generally "balancing" rotor 10 in a known manner. It will further be recalled that balancing mass 104 will be arranged radially asymmetrically about longitudinal shaft axis A. Accordingly, the single radial orientation at which each liquid containment cover 44a, 44b can be coupled with inner core component 26 ensures that when rotor 10 is disassembled for service, inspection, etc., re-balancing will not be typically necessary since liquid containment covers 44a and 44b will be reinstalled at the orientation they occupied prior to disassembly.

First liquid containment cover 44a and second liquid containment cover 44b may also each include an axially outward side 46a, 46b and an axially inward side 48a, 48b, respectively. Axially inward side 48a may include a wetted wall 50a of a first cavity 52a which fluidly connects inlet segment 16 with third segment 30. Axially inward side 44b of second liquid containment cover 44b may include a wetted wall 50b of a second cavity 52b fluidly connecting third segment 30 with outlet segment 22. In one embodiment, one or more radial passages 51 may fluidly connect between first longitudinal shaft passage 14 and first fluid cavity 52a. One or more radial passages 53 may fluidly connect between second fluid cavity 52b and second longitudinal shaft passage 22. Each fluid cavity 52a, 52b may thus be understood to comprise a portion of rotor cooling circuit 18, and each wetted wall 50a, 50b may be understood as a wetted wall of rotor cooling circuit 18.

It may further be noted from FIG. 1 that each of first liquid containment cover 44a and second liquid containment cover 44b includes a profiled shape. In particular, each liquid containment cover 44a, 44b may include a uniform cylindrical inner peripheral edge surface 108a, 108b mated with rotor shaft 12, a uniform cylindrical outer peripheral edge surface 110a, 110b, and a sloping profile between the corresponding inner peripheral edge surface 108a, 108b and outer peripheral edge surface 110a, 110b. Wetted surface or wall 50a may thus include a profiled surface which is configured to deflect a cooling liquid passing out of or from inlet segment 16 into third segment 30 of rotor cooling circuit 18. Wetted surface or wall 50b may thus include a second surface which is configured to deflect cooling liquid passing out of longitudinal core passages 28 into outlet segment 22 of rotor cooling circuit 18. In other words, as rotor 10 is rotated, and fluid pumped into inlet segment 16 is transitioned via passages 51 into cavity 52a, surface 50a may assist in deflecting the cooling liquid into longitudinal core passages 28. In a similar fashion, cooling liquid passing from longitudinal core passages 28 into cavity 52b may be deflected via surface 50b into passage 53 and outlet segment 22. It should be appreciated that passages 51 may be understood as part of inlet segment 16, and passages 53 may be understood as part of outlet segment 22.

In one embodiment, each of first liquid containment cover 44a and second liquid containment cover 44b may further include a first radial region 112a, 112b which adjoins the corresponding inner peripheral edge surface 108a, 108b, respectively. Each of liquid containment cover 44a and liquid containment cover 44b may also include a second radial region 114a, 114b, respectively, adjoining the corresponding outer peripheral edge surface 110a, 110b, respectively. Further still, each of liquid containment covers 44a and 44b may include a middle radial region 116a, 116b, respectively, extending between the corresponding first radial region 112a, 112b and second radial region 114a, 114b which includes the sloping profile. In other words, wetted surfaces 50a and 50b may be located in the corresponding middle radial region 116a, 116b of the corresponding liquid containment cover 44a, 44b. Each of the first radial region 112a, 112b and middle radial region 116a, 116b of each liquid containment cover 44a, 44b may also include a uniform material thickness between the corresponding axially outward side 46a, 46b and axially inward side 48a, 48b. As used herein, the term "uniform material thickness" should be understood to mean that material of each liquid containment cover 44a, 44b is not interrupted by voids, passages, gaps, in an axial thickness between axially outward sides 46a, 46b and axially inward sides 48a, 48b, within the stated radial regions 112a, 112b and 116a, 116b.

Figure 3:
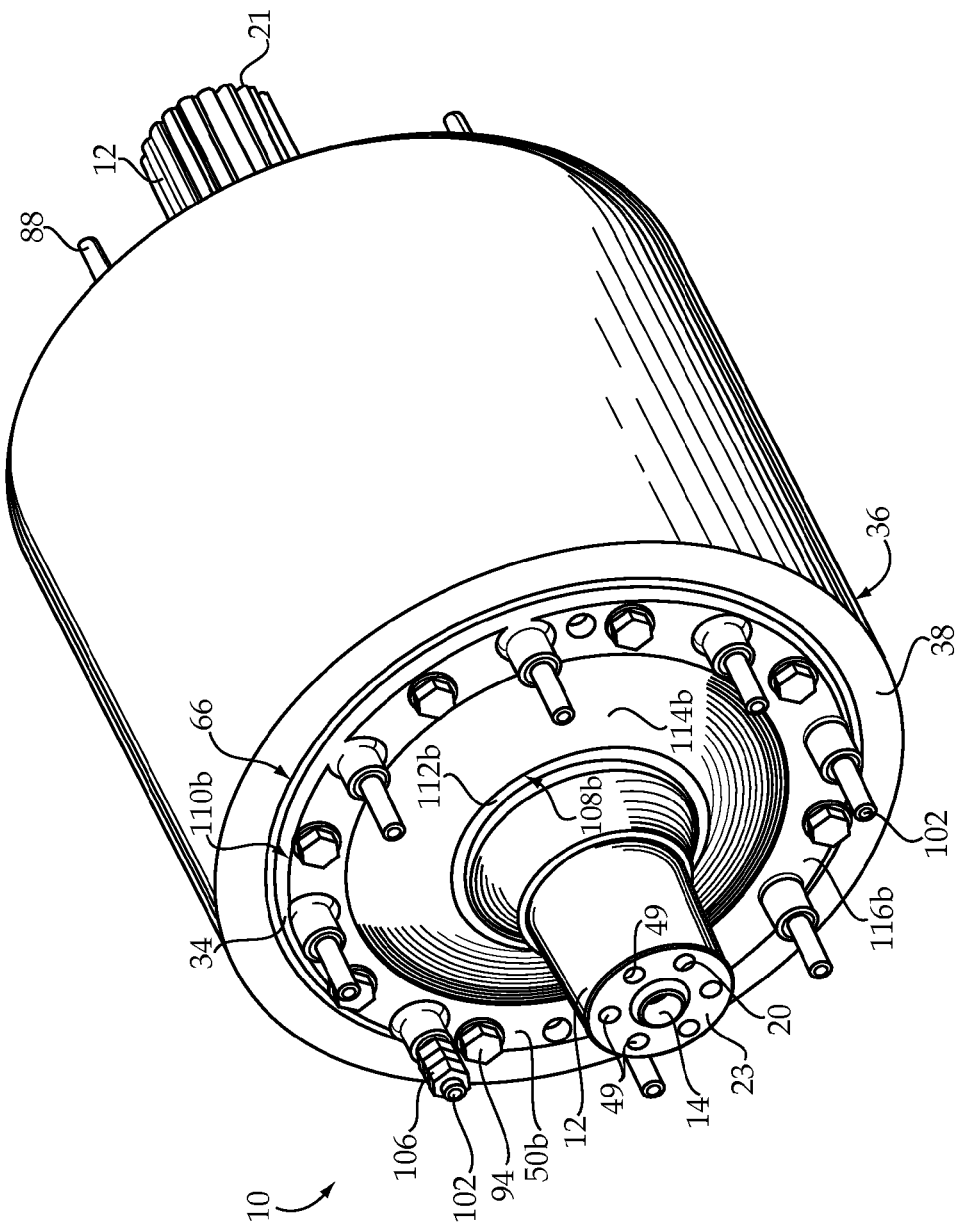
FIG. 3 is a pictorial view of a permanent magnet rotor according to one embodiment.

Referring to FIG. 3, there is shown a pictorial view of rotor 10 assembled and illustrated as it might appear prior to placing rotor 10 in service in generator 8. Liquid containment cover 50b is visible in the FIG. 3 illustration bolted to second axial inner core end 34. Seal carrier 33 is not coupled with rotor 10, nor are end cover 25, rotor speed timing mechanism 35, and certain other components depicted in FIG. 1. Rotor shaft 12 is shown projecting outwardly from second liquid containment cover 50b. In FIG. 3, a plurality of bolt holes 49 are shown which extend axially inward from second axial shaft end 23. In one embodiment, bolt holes 49 may receive bolts adapted to couple speed timing mechanism 35 with rotor shaft 12. An end of fluid passage 20 is also shown opening at second axial shaft end 23. It may be noted that fluid passage 20 is arranged radially symmetrically about inlet passage 14 with bolt holes 49. In one embodiment fluid passage 20 may have a similar diameter to bolt holes 49 and be arranged in a symmetrical pattern with bolt holes 49, hence, the similar appearance of fluid passage 20 and bolt holes 49 in FIG. 3. Also shown in FIG. 3 are balancing mass mounts 102. A set of mass elements 106 are shown positioned on one of balancing mass mounts 102 similar to FIG. 1. It should be appreciated that the particular arrangement of balancing mass mounts 106 is illustrative only, and those skilled in the art will appreciate that each individual rotor may best be balanced by way of a unique arrangement and positioning of balancing mass thereon. Permanent magnets 36 are also shown diagrammatically, positioned circumferentially about cylindrical outer surface 66.

As noted above, in one embodiment a flexible wrapping may be applied around permanent magnets 36, however, the present disclosure is not thereby limited. The profiled shape of second liquid containment cover 50b between inner peripheral edge 108b and outer peripheral edge 110b is also readily apparent in FIG. 3.

Industrial Applicability

Assembly of rotor 10 may include mounting inner core component 26 on rotor shaft 12 between first axial shaft end 21 and second axial shaft end 23. Permanent magnet outer core component 36 might be mounted on and coupled with inner core component 26 subsequent to positioning inner core component 26 on rotor shaft 12, however in a practical implementation strategy permanent magnet outer core component 36 will be positioned on inner core component 26 prior to mounting inner core component 26 on rotor shaft 12. Assembly of rotor 10 may further include positioning permanent magnet outer core component 36 circumferentially about inner core component 26, which as suggested might take place prior to positioning inner core component 26 on rotor shaft 12. Rotor 10 is contemplated to rotate in a speed range up to about 2400 RPM, although the present disclosure is not thereby limited. This relatively lower speed range, compared with designs such as Tornquist et al., may allow retention of magnets 38 without the need for complex, expensive or unwieldy mechanisms such as retaining rings, fasteners or specially designed retention caps. The magnetic field of rotor 10 may also be relatively more dense than in other permanent magnet rotors where specialized retention mechanisms interfere with, distort, weaken, etc., a magnetic field associated with the device. The present disclosure contemplates permanent magnets having no internal voids or spaces and being packed together as closely as practicable.

With inner core component 26 and permanent magnet outer core component 36 assembled and mounted on rotor shaft 12, inlet segment 16 of rotor cooling circuit 18 may be fluidly connected with segment 30 at least in part by sealingly coupling first liquid containment cover 44a to first axial end 32 of inner core component 26. As described herein, sealingly coupling first liquid containment cover 44a may include bolting first liquid containment cover 44a to first radial land area 74 at a location radially inward of cylindrical outer surface 66 and radially outward of longitudinal core passages 28. Assembly of rotor 10 may further include connecting rotor cooling circuit segment 30 with outlet segment 16 at least in part by sealingly coupling second liquid containment cover 44b to second axial end 34 of inner core component 26. Also as described herein, second liquid containment cover 44b may be bolted to second radial land area 76 at a mounting location radially inward of cylindrical outer surface 66 and radially outward of longitudinal core passages 28.

During operation of generator 8, a temperature increase of permanent magnets 38 will tend to be induced by rotating rotor core 24 within stator 19. The present disclosure contemplates a unique mechanism for dissipating heat from rotor core 24, in cooperation with rotor cooling circuit 18. Dissipating heat from rotor core 24 may include passing a cooling liquid between a longitudinal shaft passage 14, 20 extending longitudinally in rotor shaft 12 and longitudinally extending core passages or core cooling passages 28. As described herein, cooling liquid may be pumped into inlet 27, then pass longitudinally through passage 14, and then radially outward through passages 51. Cooling liquid passing from passages 51 may enter cavity 52a. Within cavity 52a, wetted surface 50a may assist in deflecting the cooling liquid into longitudinal core passages 28. Within longitudinal core passages 28, the cooling liquid may exchange heat with inner core component 26, and then may be passed into cavity 52b. Within cavity 52b, wetted surface 50b may assist in deflecting the cooling liquid into passage 53. The cooling liquid may then pass through passage 20 and thenceforth through a bore in rotor timing mechanism 35, through seal carrier 33 and out through outlet 29. The cooling liquid may then be cooled via a radiator or the like, and recirculated back through rotor core 24.

As mentioned above, the cooling liquid passing through rotor cooling circuit 18 may be contained via first liquid containment cover 44a and also contained via second liquid containment cover 44b. Dissipation of heat by way of cooling system 41 may thus take place via directing and containing cooling liquid with the internal plumbing and liquid containment components of rotor 10 illustrated in the drawings and described herein. The manner in which heat is transferred also differs from certain known designs. It will be recalled that operation of generator 8 induces a temperature increase in permanent magnets 38. Heat energy may be transferred from permanent magnets 38 to inner core component 26 by way of a solid-to-solid heat rejection path 60 which extends radially inward from permanent magnets 38 into inner core component 26. Thus, positioning permanent magnet outer core component 36 circumferentially about inner core component 26 may be understood to establish solid-to-solid heat rejection path 60. In addition, a solid-to-fluid heat rejection path 62 may be established between inner core component 26 and rotor cooling circuit segment 30. In particular, fluidly connecting rotor cooling circuit segment 16 with rotor cooling circuit segment 30, and fluidly connecting rotor cooling circuit segment 30 with rotor cooling circuit segment 22 may be understood as establishing solid-to-fluid heat rejection path 62 since it enables the exchange of heat between inner core component 26 and cooling liquid passed through longitudinal core passages 28. Heat energy of permanent magnet outer core component 36 and inner core component 26 is thus at least predominantly rejected in a radially inward average thermal transfer direction, as represented by heat rejection paths 60 and 62.

As alluded to above, the thermal transfer and heat dissipation strategies contemplated by the present disclosure differ from earlier designs such as Tornquist et al. wherein heat is dissipated from an inner core component, if at all, at least predominantly in a radially outward direction. The present strategy is considered to provide a reliable and effective method of cooling rotor core 24 during operation without undue expense and complexity. In some instances, permanent magnets 38 may be formed of materials which are relatively sensitive to temperature extremes. Accordingly, it may be desirable to reject heat induced therein in an efficient manner to avoid overheating of the magnets. As also discussed above, permanent magnets may in some instances and in certain cooling strategies accumulate magnetic debris. The present disclosure packages the entire cooling system internally of permanent magnets 38 such that the likelihood of accumulating magnetic material on permanent magnets 38 is reduced or eliminated, while also providing for an efficient and straightforward cooling mechanism. Moreover, in contrast to an air-cooled design, generator 8 may be substantially sealed from ambient, facilitating use in wet, debris laden or dusty environments. This capability may be advantageous where generator 8 is used in a propulsion or other on-board system for construction or earth moving machines and the like.

It may still further be appreciated that the present rotor cooling strategy enables certain components such as liquid containment covers 44a and 44b to serve multiple functions. In particular, as discussed above balancing mass 104, 106 may be positioned on liquid containment covers 44a and 44b. By utilizing liquid containment covers 44a and 44b as the location for positioning balancing mass, costly alternative balancing strategies such as reconfiguration or enlargement of components of rotor 10 may be avoided. In certain earlier designs, such as air-cooled permanent magnet rotors, balancing mass was often positioned directly on ends of the rotor core. While effective in certain instances, such strategies requires use of surface area on ends of the rotor. In the present case, liquid containment covers 44a and 44b occupy space which in a similar air cooled rotor design might have been used for positioning balancing mass. By selecting the location of balancing mass mounts to be on covers 44a, 44b in the present design, it is not necessary to enlarge or otherwise reconfigure rotor 10 to accommodate the placement of balancing mass.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent from an examination of the attached drawings and appended claims.

We claim:

1. A method of assembling a permanent magnet rotor for an electrical generator comprising:
   mounting an inner core component having a plurality of longitudinally extending core passages coaxially on a rotor shaft defining a first longitudinally extending shaft passage and a second longitudinally extending shaft passage;
   positioning a permanent magnet outer core component circumferentially about the inner core component;
   fluidly connecting a first rotor cooling circuit segment which includes the first longitudinally extending shaft passage with a second rotor cooling circuit segment which includes the plurality of longitudinally extending core passages via sealingly coupling a first liquid containment cover to a first axial end of the inner core component at a first mounting location which is radially inward of a cylindrical outer surface of the inner core component; and
   fluidly connecting the second rotor cooling circuit segment with a third rotor cooling circuit segment which includes the second longitudinally extending shaft passage via sealingly coupling a second liquid containment cover to a second axial end of the inner core component at a second mounting location which is radially inward of the cylindrical outer surface of the inner core component.

2. The method of claim 1 further comprising:
   establishing a solid-to-solid heat rejection path extending radially inward from a plurality of permanent magnets of the permanent magnet outer core component into the inner core component by way of positioning the permanent magnet outer core component circumferentially about the inner core component; and
   establishing a solid-to-fluid heat rejection path extending from the inner core component into the second rotor cooling circuit segment by way of fluidly connecting the first rotor cooling circuit segment with the second rotor cooling circuit segment and fluidly connecting the second rotor cooling circuit segment with the third rotor cooling circuit segment.

3. The method of claim 1 wherein:
   fluidly connecting the first rotor cooling circuit segment further includes bolting the first liquid containment cover to a first radial land area located on the first axial end; and
   fluidly connecting the second rotor cooling circuit segment further includes bolting the second liquid containment cover to a second radial land area located on the second axial end.

4. The method of claim 3 wherein:
   bolting the first liquid containment cover further includes bolting the first liquid containment cover via a first bolted joint having a first set of bolts mated with a first set of bolt holes formed in the first radial land area and a first O-ring seal positioned between the first radial land area and the first liquid containment cover; and
   bolting the second liquid containment cover further includes bolting the second liquid containment cover via a second bolted joint having a second set of bolts mated with a second set of bolt holes formed in the second radial land area and a second O-ring seal positioned between the second radial land area and the second liquid containment cover.

5. The method of claim 4 further comprising orienting each of the first and second liquid containment covers with respect to the inner core component at least in part by aligning radially asymmetric bolt holes formed in each one of the first and second liquid containment covers with radially asymmetric bolt holes formed in the respective first and second radial land areas.

6. The method of claim 1 further comprising:
   forming a wetted wall of a first cavity fluidly connecting the first rotor cooling circuit segment with the second rotor cooling circuit segment via an axially inward side of the first liquid containment cover; and
   forming a wetted wall of a second cavity fluidly connecting the second rotor cooling circuit segment with the third rotor cooling circuit segment via an axially inward side of the second liquid containment cover.

7. The method of claim 1 further comprising mounting a balancing mass upon at least one of the first and second liquid containment covers.

* * * * *